United States Patent [19]

Machida

[11] Patent Number: 5,342,080

[45] Date of Patent: Aug. 30, 1994

[54] VEHICLE HEIGHT CONTROL SYSTEM

[75] Inventor: Hiromi Machida, Kanagawa, Japan

[73] Assignee: Tokico, Ltd., Kanagawa, Japan

[21] Appl. No.: 111,474

[22] Filed: Aug. 25, 1993

Related U.S. Application Data

[62] Division of Ser. No. 936,832, Aug. 28, 1992, Pat. No. 5,288,102.

[30] Foreign Application Priority Data

Aug. 30, 1991 [JP] Japan ................... 3-245069
Jun. 26, 1992 [JP] Japan ................... 4-193451

[51] Int. Cl.⁵ ............... B60G 17/04; F16F 9/342
[52] U.S. Cl. ......................... 280/708; 280/714;
                                    280/6.12; 267/64.18
[58] Field of Search ............ 280/708, 714, 6.12;
       267/64.16, 64.18, 64.22, 64.28, 218; 188/281,
                                                     299

[56] References Cited

U.S. PATENT DOCUMENTS

| | | | |
|---|---|---|---|
| 2,885,202 | 5/1959 | Trumper | 280/6.12 |
| 3,945,664 | 3/1976 | Hiruma | 280/708 |
| 4,664,410 | 5/1987 | Richard | 280/714 |
| 5,141,244 | 8/1992 | Clotault et al. | 280/714 |

FOREIGN PATENT DOCUMENTS

| | | | |
|---|---|---|---|
| 0348286A1 | 12/1989 | European Pat. Off. | 280/708 |
| 0444981 | 9/1991 | European Pat. Off. | 280/714 |
| 0444981A1 | 9/1991 | European Pat. Off. | 280/714 |
| 2436030 | 5/1980 | France | 280/708 |
| 60-102114 | 7/1985 | Japan . | |

Primary Examiner—Margaret A. Focarino
Assistant Examiner—Peter English
Attorney, Agent, or Firm—Wenderoth, Lind & Ponack

[57] ABSTRACT

A vehicle height control system has oil under pressure generated by a pump, the oil being charged into and discharged from a cylinder that is provided for each wheel through a charge-discharge valve. This action effects vehicle height control. The control system includes a gas spring that has two gas chambers and is connected to the cylinder. A pilot-controlled directional control valve has a pilot chamber and is provided on the gas spring so as to selectively communicate and cut off from each other the gas chambers. The directional control valve is drivable in response to charging and discharging of oil under pressure through a pilot line which is connected at one end thereof to the pilot chamber of the directional control valve and at the other end thereof to a passage connecting the charge-discharge valve and the pump.

2 Claims, 8 Drawing Sheets

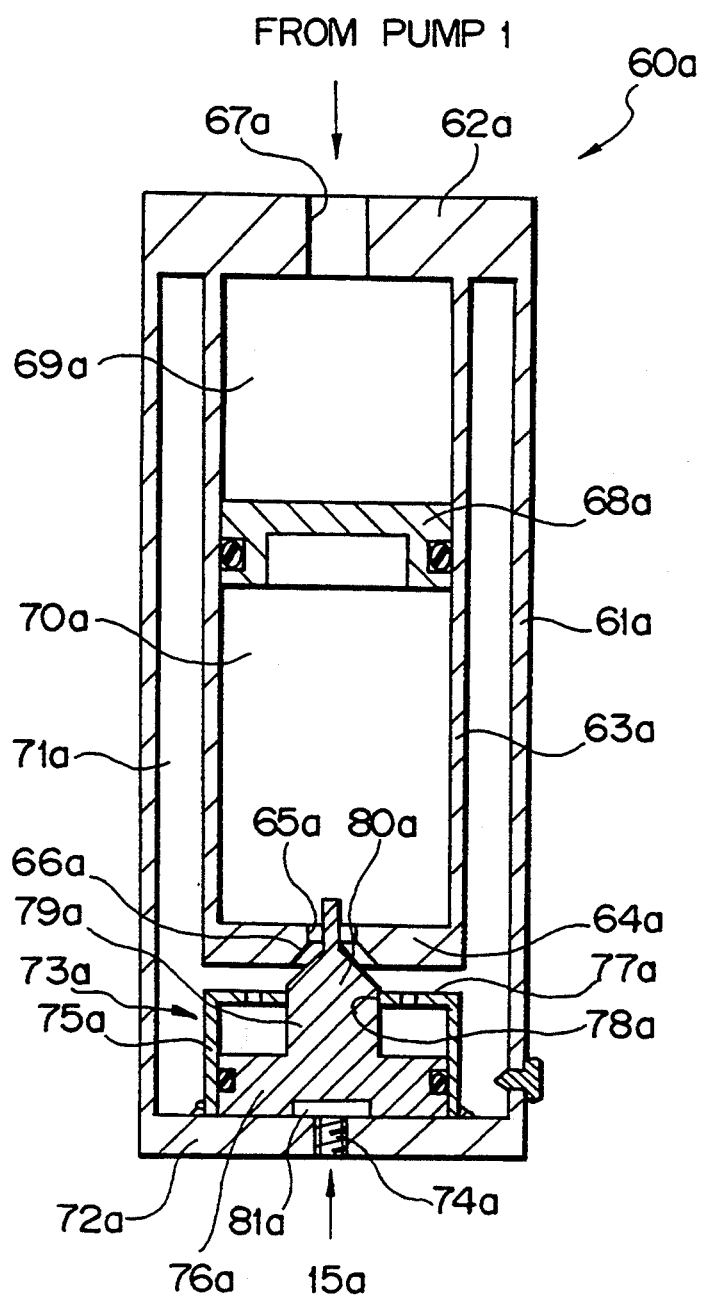

VEHICLE HEIGHT CONTROL SYSTEM

This application is a divisional of application No. 07/036,832, filed Aug. 28, 1992 now U.S. Pat. No. 5,288,102.

BACKGROUND OF THE INVENTION

1. Field of the Invention

The present invention relates to a system for controlling the height of a vehicle.

2. Description of the Prior Art

Japanese Utility Model Application Public Disclosure No. 60-102114 (1985) discloses one example of a conventional vehicle height control system. The disclosed vehicle height control system primarily comprises a pump for generating oil pressure, a charge-discharge valve which is interposed between the pump and a cylinder provided for each wheel, three accumulators (gas springs) which are connected in parallel through a passage to a communicating passage connecting together the cylinder and the charge-discharge valve, and a solenoid-operated directional control valve which is provided in the intermediate portion of the passage connecting the accumulators, the solenoid-operated directional control valve being changeable between two positions, that is, a conducting position where the valve produces no orifice resistance, and a throttling position where the valve provides a proper orifice resistance.

The conventional vehicle height control system is arranged such that oil pressure that is generated by the pump is charged into and discharged from the cylinder through the charge-discharge valve to effect vehicle height control, while the solenoid-operated directional control valve is properly opened and closed to bring the gas springs in and out of communication with each other, thereby changing the overall spring constant of the gas springs provided for the cylinder, and thus making it possible to control the vehicle attitude stabilizing characteristics and provide a comfortable vehicle ride.

Incidentally, it is desired that the vehicle height control system should be as small in size as possible, because it is provided in a limited space between a vehicle body and an axle. However, the above-described conventional vehicle height control system includes a solenoid-operated directional control valve which is arranged to be changeable between two positions, that is, a conducting position where the valve produces no orifice resistance, and a throttling position where the valve provides a suitable orifice resistance. As such, it is necessary to ensure a sufficiently large orifice area to establish a conducting state which is sufficiently unrestricted in contrast to the case of the throttling state. If such a large orifice area is ensured, a correspondingly large pressure difference is produced in the throttling state, so that a large-sized solenoid must be employed for the directional control valve in order to allow the valve to be opened and closed reliably against such a large pressure difference, thus resulting in an increase in the overall size of the system.

SUMMARY OF THE INVENTION

In view of the above-described circumstances, it is an object of the present invention to provide a vehicle height control system which is capable of changing the spring constant of gas springs with a compact arrangement.

To this end, the present invention provides a vehicle height control system in which pressure oil that is generated by a pump is charged into and discharged from a cylinder provided for each wheel through a charge-discharge valve, thereby effecting vehicle height control. A plurality of gas springs are connected in parallel to the cylinder, and a pilot-controlled directional control valve is interposed between the gas springs. The directional control valve is drivable in response to charging and discharging of oil under pressure through a pilot line, which is connected at one end thereof to a pilot chamber of the directional control valve and at the other end thereof to a passage connecting together the charge-discharge valve and the pump.

In addition, the present invention provides a vehicle height control system in which oil under pressure that is generated by a pump is charged into and discharged from a cylinder provided for each wheel through a charge-discharge valve, thereby effecting vehicle height control, comprising a gas spring having two gas chambers and a pilot-controlled directional control valve associated with the cylinder, which allows two gas chambers of a gas spring to be selectively communicated with and cut off from each other. The directional control valve is drivable in response to charging and discharging of oil under pressure through a pilot line which is connected at one end thereof to a pilot chamber of the directional control valve and at the other end thereof to a passage connecting together the charge-discharge valve and the pump.

According to the first aspect of the present invention, the pilot-controlled directional control valve is opened and closed in response to charging and discharging of pressure oil through the pilot line to allow a plurality of gas springs to be selectively communicated with the cylinder in such a manner that when the directional control valve is opened, the gas springs are communicated with the cylinder in parallel, whereas when the directional control valve is closed, only one of the gas springs is communicated with the cylinder, thereby changing the spring constant.

According to the second aspect of the present invention, the two gas chambers provided in the gas spring are selectively communicated with and cut off from each other by the pilot-controlled directional control valve, thereby changing the spring constant.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 8 is a sectional view of a gas spring employed in the vehicle height control system shown in FIG. 7.

DESCRIPTION OF THE PREFERRED EMBODIMENTS

Figure 1:
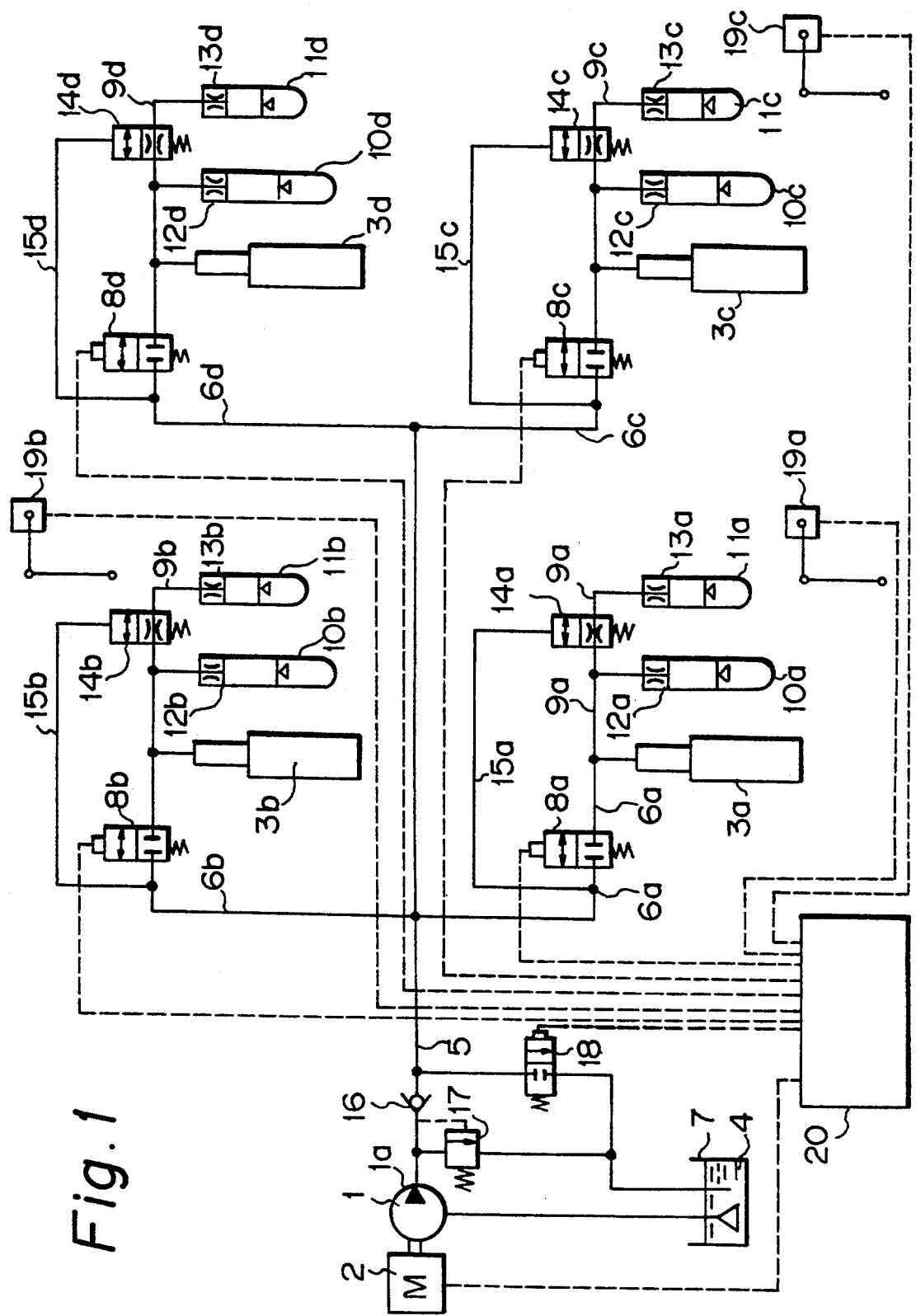
FIG. 1 is a hydraulic circuit diagram showing schematically a first embodiment of the vehicle height control system according to the present invention.

A first embodiment of the vehicle height control system according to the present invention will be described below with reference to FIG. 1.

A pump 1 is driven by an electric motor 2. Front left, front right, rear left and rear right cylinders 3a, 3b, 3c and 3d are provided for front left, front right, rear left and rear right wheels, respectively. The cylinders 3a, 3b, 3c and 3d extend and contract in response to charging and discharging of hydraulic oil 4, thereby controlling the height of the vehicle. A discharge opening 1a of the pump 1 is connected to the respective cylinder chambers (not shown) of the cylinders 3a, 3b, 3c and 3d through a main line 5 that is connected to the pump 1 and further through front left, front right, rear left and rear right branch lines 6a, 6b, 6c and 6d that branch out from the main line 5. The pump 1 sucks in the hydraulic oil 4 stored in a reservoir tank 7 to generate pressure oil and discharges the pressure oil from the discharge opening 1a to the main line 5.

Solenoid-operated front left, front right, rear left and rear right charge-discharge valves 8a, 8b, 8c and 8d are interposed in the branch lines 6a, 6b, 6c and 6d, respectively. In addition, pairs of first and second gas springs 10a and 11a, 10b and 11b, 10c and 11c, and 10d and 11d are connected to the branch lines 6a, 6b, 6c and 6d through passages 9a, 9b, 9c and 9d, respectively. In this case, first damping force valves 12a, 12b, 12c and 12d are incorporated in the first gas springs 10a, 10b, 10c and 10d, respectively, and second damping force valves 13a, 13b, 13c and 13d in the second gas springs 11a, 11b, 11c and 11d, respectively.

Front left, front right, rear left and rear right pilot-controlled directional control valves 14a, 14b, 14c and 14d are interposed in the respective intermediate portions of the passages 9a, 9b, 9c and 9d. The respective pilot chambers of the pilot-controlled directional control valves 14a, 14b, 14c and 14d are connected to the branch lines 6a, 6b, 6c and 6d through pilot lines 15a, 15b, 15c and 15d at the upstream sides of the charge-discharge valves 8a, 8b, 8c and 8d. The pilot-controlled directional control valves 14a, 14b, 14c and 14d open when pressure oil is supplied to their pilot chambers through the pilot lines 15a, 15b, 15c and 15d, thereby providing communication between each of the pairs of first and second gas springs 10a and 11a, 10b and 11b, 10c and 11c, and 10d and 11d.

In addition, a check valve 16 is provided in the main line 5, and a relief valve 17 is provided in the main line 5 at the upstream side of the check valve 16. Moreover, a solenoid-operated oil discharging valve 18, which is capable of being opened and closed, and which is normally closed, is interposed between a portion of the main line 5 which is downstream from check valve 16 and the reservoir tank 7. Front left, front right and rear height sensors 19a, 19b and 19c are each interposed between the upper and lower sides of the corresponding spring on the vehicle to detect a vehicle height and output a signal representative of the detected vehicle height.

A controller 20 is connected to the front left, front right and rear height sensors 19a, 19b and 19c, the motor 2, the oil discharging valve 18 and the charge-discharge valves 8a, 8b, 8c and 8d. The controller 20 controls the devices connected thereto on the basis of signals from the height sensors 19a, 19b and 19c so that the hydraulic oil 4 is properly charged into and discharged from the cylinders 3a, 3b, 3c and 3d to effect vehicle height control. The controller 20 is also capable of opening and closing the oil discharging valve 18 and the charge-discharge valves 8a, 8b, 8c and 8d on the basis of a signal input thereto through an interface (not shown) or preset conditions.

In the vehicle height control system arranged as described above, when the vehicle height is low or lower than the normal level, the controller 20, which is supplied with the detection signals from the height sensors 19a, 19b and 19c, operates the pump 1 and opens the charge-discharge valves 8a, 8b, 8c and 8d to supply oil under pressure to the cylinders 3a, 3b, 3c and 3d, thereby raising the vehicle height. When the vehicle height is high or higher than the normal level, the controller 20 opens the charge-discharge valves 8a, 8b, 8c and 8d and also opens the oil discharging valve 18 on the basis of the detection signals from the height sensors 19a, 19b and 19c, thereby draining the oil from the cylinders 3a, 3b, 3c and 3d and thus lowering the vehicle height.

It should be noted that when pump 1 is operated with the oil discharging valve 18 closed, as described above, oil under pressure is supplied to the pilot chambers of the pilot-controlled directional control valves 14a, 14b, 14c and 14d through the pilot lines 15a, 15b, 15c and 15d, causing the valves 14a, 14b, 14c and 14d to open, and thus providing communication between each of the pairs of first and second gas springs 10a and 11a, 10b and 11b, 10c and 11c, and 10d and 11d. In consequence, the overall spring constant of the gas springs associated with the cylinders 3a, 3b, 3c and 3d becomes lower than in the case where only the first gas springs 10a, 10b, 10c and 10d are activated, thus obtaining relatively "soft" suspension characteristics so as to provide a comfortable vehicle ride.

When the oil discharging valve 18 is opened, the oil pressure at the upstream side of the pilot lines 15a, 15b, 15c and 15d is lowered. In consequence, the pilot-controlled directional control valves 14a, 14b, 14c and 14d are closed, so that only the first gas springs 10a, 10b, 10c and 10d function as gas springs for the cylinders 3a, 3b, 3c and 3d. As a result, the spring constant of the gas springs for the cylinders 3a, 3b, 3c and 3d rises, thus providing relatively "hard" suspension characteristics so as to provide a comfortable vehicle ride.

Thus, in this embodiment the control of the spring constant is realized without using solenoid-operated directional control valves. Accordingly, there is no increase in the size of solenoid means which would otherwise be demanded when solenoid-operated directional control valves are employed, and hence no increase in the overall size of the system is necessary. Accordingly, a compact vehicle height control system can be realized. In the prior art that employs solenoid-operated directional control valves, there is a likelihood that the valve closing operation will not be effectively performed with the driving force derived from a solenoid because the pressure of the hydraulic oil 4 is high. In this embodiment, however, the pilot-controlled directional control valves 14a, 14b, 14c and 14d make it possible to derive a large driving force from the oil pressure, and there is no danger of the required valve closing operation failing to be effected. Thus, it is possible to obtain a vehicle height control system which is highly reliable.

Figure 2:
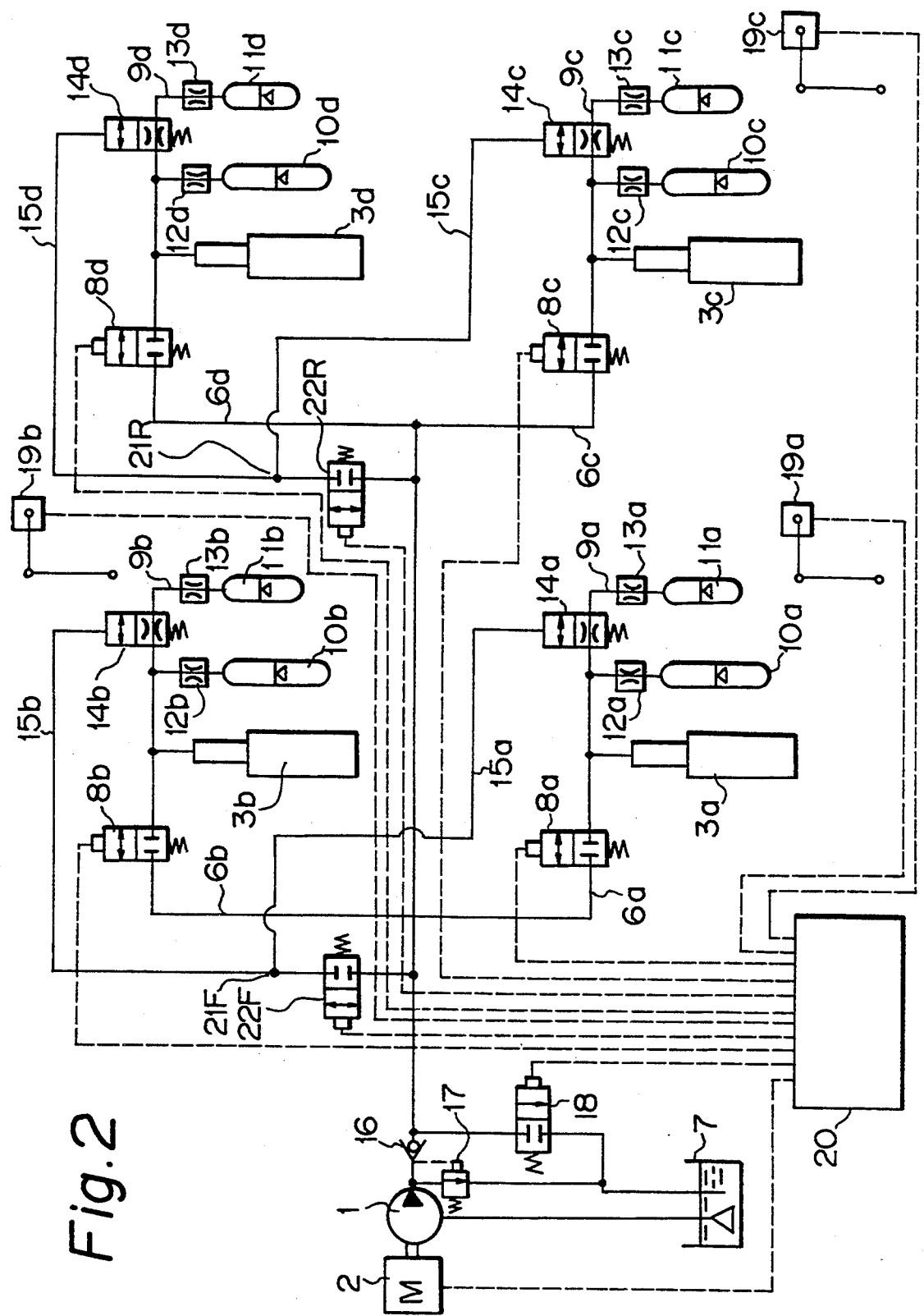
FIG. 2 is a hydraulic circuit diagram showing schematically a second embodiment of the vehicle height control system according to the present invention.

In the foregoing embodiment, the pilot lines 15a, 15b, 15c and 15d of the pilot-controlled directional control valves 14a, 14b, 14c and 14d are connected to the branch lines 6a, 6b, 6c and 6d, respectively, whereas, in a vehicle height control system (second embodiment) shown in FIG. 2, the upstream ends of the front left and right pilot lines 15a and 15b are connected together to define a junction 21F, which is connected to the main line 5 through a solenoid-operated cutoff valve 22F, and the upstream ends of the rear left and right pilot lines 15c and 15d are similarly connected together to define a junction 21R, which is connected to the main line 5 through a solenoid-operated cutoff valve 22R. In this vehicle height control system, the spring constant for the front cylinders 3a and 3b on the one hand and the spring constant for the rear cylinders 3c and 3d on the other hand can be selectively controlled. In addition, damping force at the front side and that at the rear side can be controlled independently of each other, so that it is possible to obtain damping force characteristics over a wider range.

Although in the foregoing embodiments pilot-controlled directional control valves 14a, 14b, 14c and 14d are throttled at one of the two changeover positions, these valves may be closed at that changeover position instead of establishing a throttling state.

Although in the foregoing embodiments the first and second damping force valves 12a, 12b, 12c, 12d, 13a, 13b, 13c and 13d are incorporated in the first and second gas springs 10a, 10b, 10c, 10d, 11a, 11b, 11c and 11d, respectively, the arrangement may be such that the first and second damping force valves are omitted, and damping force mechanisms provided for the respective cylinders 3a, 3b, 3c and 3d instead, thereby changing the spring constant of the gas springs without the damping force being changed.

The arrangement shown in FIG. 2 may be modified such that the cutoff valves 22F and 22R are omitted, and the upstream ends of the front left and right pilot lines 15a and 15b are communicated with each other, while the upstream ends of the rear left and right pilot lines 15c and 15d are communicated with each other, and solenoid-operated cutoff valves are interposed in the pilot lines 15a, 15b, 15c and 15d, respectively. With this arrangement, the spring constants for the four wheels can be changed independently of each other, so that it is possible to control the vehicle ride with high accuracy.

Figure 3:
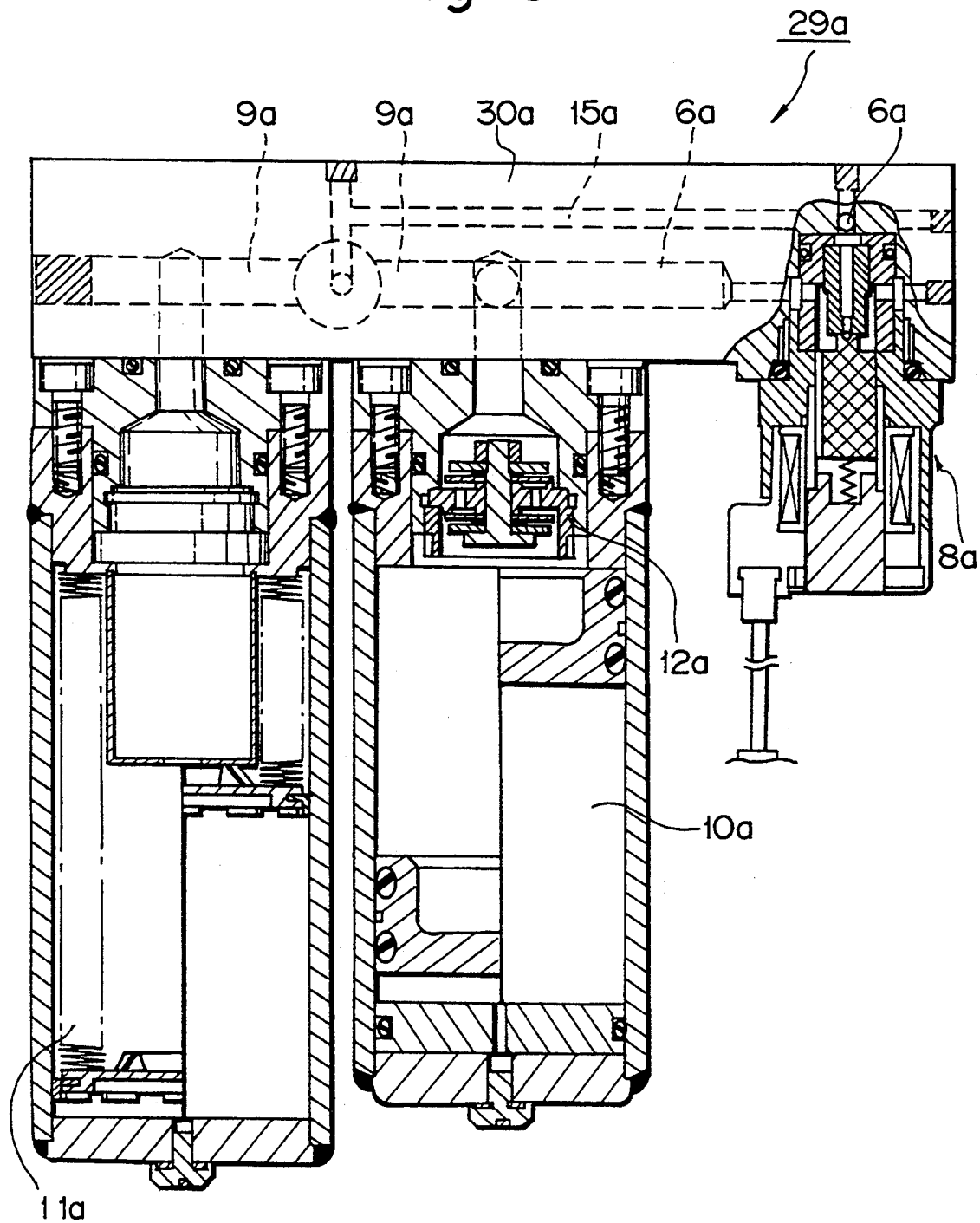
FIG. 3 is a partial, sectional side elevation view showing a block member which may be employed in place of a combination of a first gas spring, a second gas spring, a directional control valve and so forth in the vehicle height control system shown in FIGS. 1 or 2.
Figure 4:
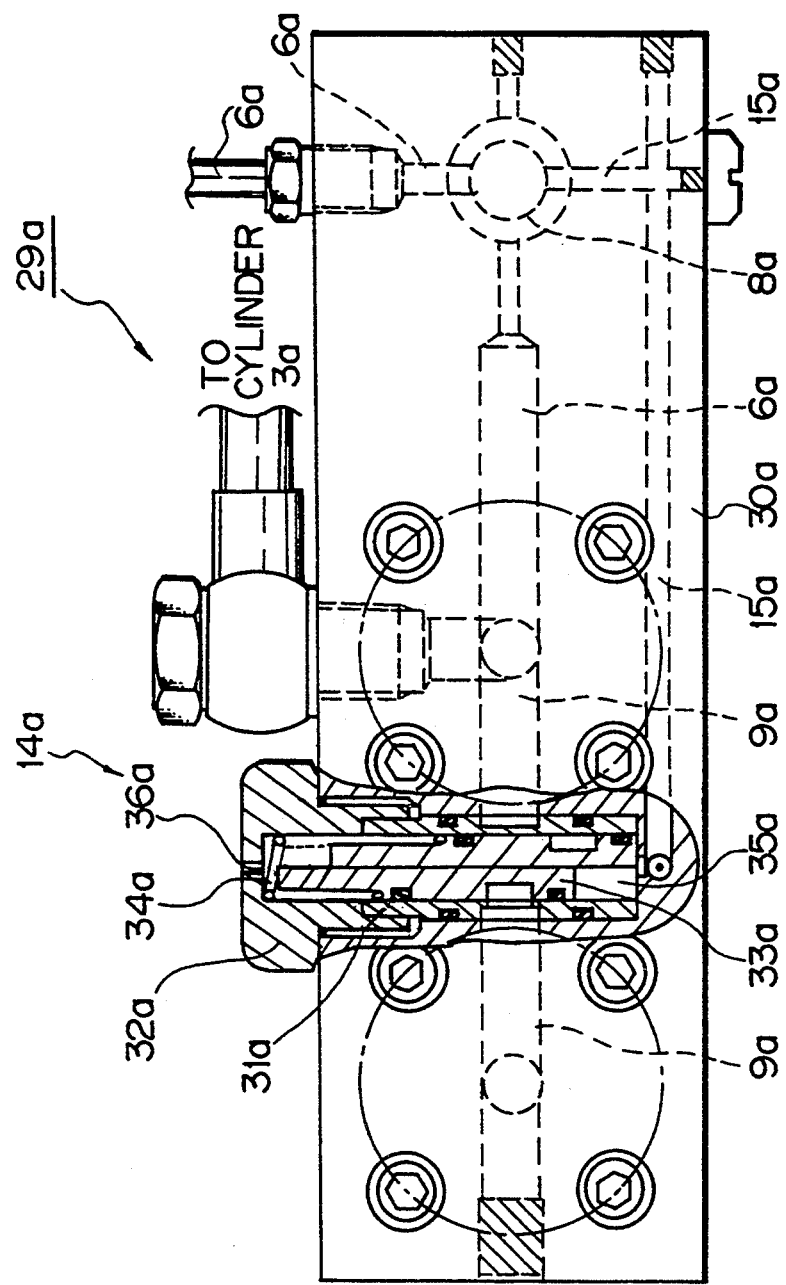
FIG. 4 is a partial sectional plan view of the block member shown in FIG. 3.
Figure 5:
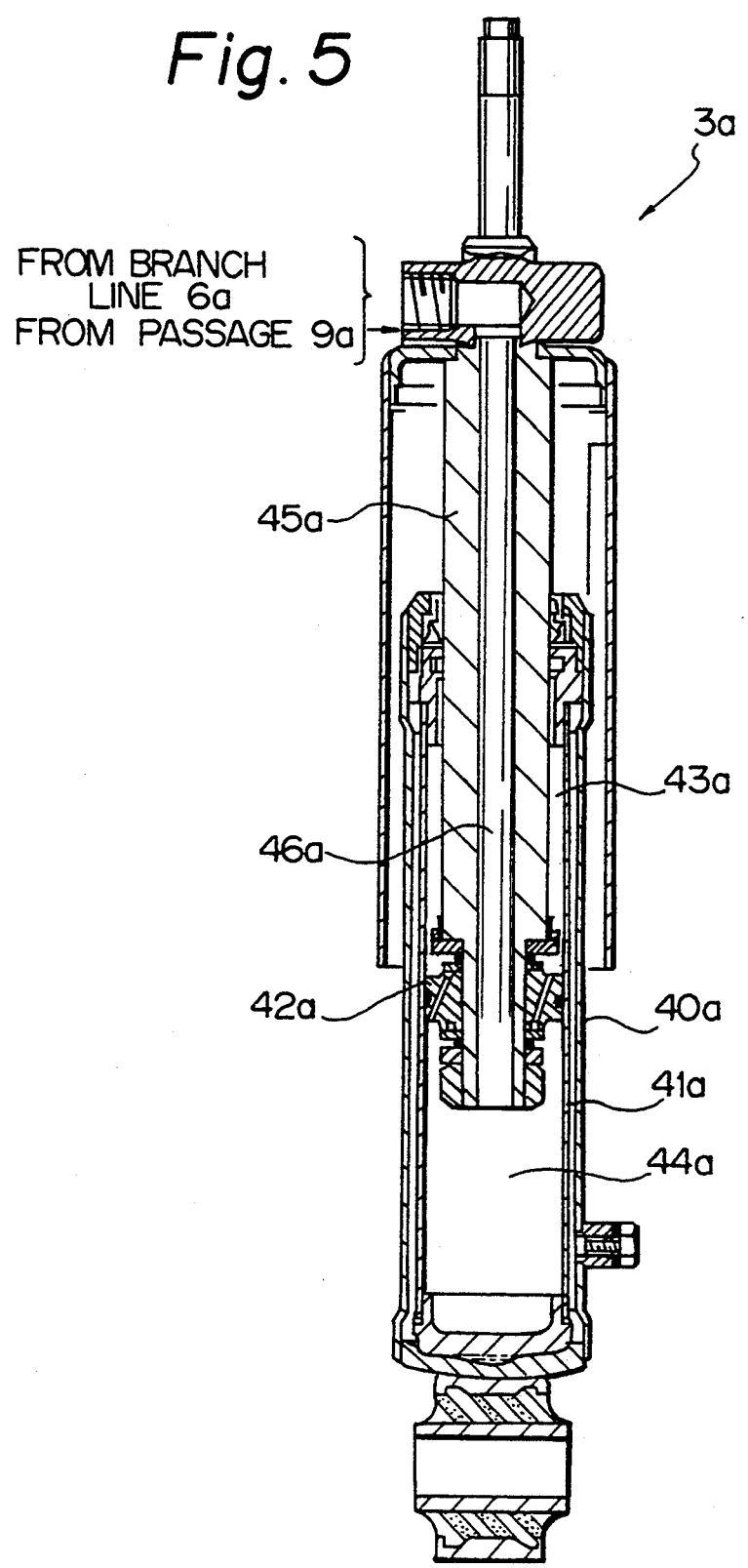
FIG. 5 is a sectional view showing specifically a cylinder employed in the vehicle height control system shown in FIGS. 1 or 2.

As specific examples of the assemblies comprising the charge-discharge valves 8a, 8b, 8c and 8d, the first gas springs 10a, 10b, 10c and 10d, the second gas springs 11a, 11b, 11c and 11d, the first damping force valves 12a, 12b, 12c and 12d, the second damping force valves 13a, 13b, 13c and 13d and the pilot-controlled directional control valves 14a, 14b, 14c and 14d in the vehicle height control systems shown in FIGS. 1 and 2, block members 29a such as shown in FIGS. 3 and 4 may be provided for the front left, front right, rear left and rear right wheels (in this case, the block members for the four wheels have the same arrangement; in the figures, only the block member for the front left wheel is shown, and the following description will be made using this block member as a representative). As the cylinders 3a, 3b, 3c and 3d, cylinders such as shown in FIG. 5 may be employed (the cylinders 3a, 3b, 3c and 3d for the four wheels have the same arrangement; in the figure, only the cylinder 3a for the front left wheel is shown, and the following description will be made with reference to the cylinder 3a.

Referring to FIGS. 3 and 4, the block member 29a comprises a shaft-shaped assembly body 30a. The branch line 6a is led to the inside of the assembly body 30a from the outside and connected through the charge-discharge valve 8a to the cylinder 3a that is provided outside the assembly body 30a. Further, the branch line 6a is connected to the passage 9a inside the assembly body 30a. The passage 9a is connected with the first gas spring 10a having the first damping force valve 12a and the second gas spring 11a. The pilot-controlled directional control valve 14a is provided in the passage 9a at a position between the first and second gas springs 10a and 11a. As is clearly shown in FIG. 3, the branch line 6a is always communicated with the pilot line 15a at the upper side of the charge-discharge valve 8a. In other words, the pilot-controlled directional control valve 14a is connected to the branch line 6a without the charge-discharge valve 8a being interposed therebetween. It should be noted that in FIG. 3 the second damping force valve 13a is not provided in the second gas spring 11a so as to lower the damping force characteristics in a "soft" suspension condition.

The first gas spring 10a is of the free piston type, while the second gas spring 11a is of the bellows type. There is substantially no frictional resistance to movement of the bellows. Therefore, in the "soft" suspension mode in which the two gas springs are connected to each other, operation of the cylinder is made more smooth, thereby providing a more comfortable riding feel. The gas springs 10a and 11a are fixed to the assembly body 30a by means of bolts (not shown). In FIG. 3, the right-hand halves of the first and second gas springs 10a and 11a show conditions established when the pressure is low, whereas the left-hand halves thereof show conditions established when the pressure is high.

The pilot-controlled directional control valve 14a comprises a substantially cylindrical barrel 31a which is interposed in the intermediate portion of the passage 9a and the inside of which is communicated with the passage 9a, a plug 32a which is attached to the barrel 31a in such a manner as to cover one end of the hollow portion of the barrel 31a, a spool 33a which is slidably received in the barrel 31a, a spring 34a which is interposed between one end of the spool 33a and the plug 32a, and a pilot chamber 35a which is formed in the other end portion of the spool 33a such as to be communicated with the pilot line 15a. The spool 33a is displaced in response to oil pressure applied to the pilot chamber 35a, thereby allowing the two sections of the passage 9a to be selectively communicated with and cut off from each other. It should be noted that in FIG. 4 the right-hand half of the pilot-controlled directional control valve 14a shows a state where the spool 33a is in a position for closing the valve, while the left-hand half thereof shows a state where the spool 33a is in a position for opening the valve.

The cylinder 3a is of the twin-tube type in which an inner tube 41a is accommodated in an outer tube 40a, and a piston 42a that is equipped with a damping force generating mechanism is slidably received in the inner tube 41a to define a first chamber 43a and a second chamber 44a inside the inner tube 41a. One end of a hollow piston rod 45a is connected to the piston 42a, while the other end of the piston rod 45a extends outside the inner tube 41a so that the outer end of a through-hole 46a in the piston rod 45a is communicated with the branch line 6a and the passage 9a.

In the vehicle height control system that employs the block member 29a shown in FIGS. 3 and 4 and the cylinder 3a shown in FIG. 5, when oil is supplied under pressure from the pilot line 15a, the spool 33a is pressed, thus opening the pilot-controlled directional control valve 14a. In consequence, the first and second gas springs 10a and 11a are communicated with each other, so that the spring constant becomes lower, thus providing relatively "soft" suspension characteristics suitable for a comfortable vehicle ride.

When the oil discharging valve 18 is opened, the spool 33a is pressed back by the spring 34a to close the pilot-controlled directional control valve 14a, so that the spring constant becomes higher, thus providing a relatively "hard" suspension characteristics suitable for a comfortable vehicle ride.

In addition, since the block member 29a is a unitized member comprising the charge-discharge valve 8a, the first gas spring 10a, the second gas spring 11a, the first damping force valve 12a and the pilot-controlled directional control valve 14a, these components need not be handled individually. Thus, superior assembleability is attained.

Figure 6:
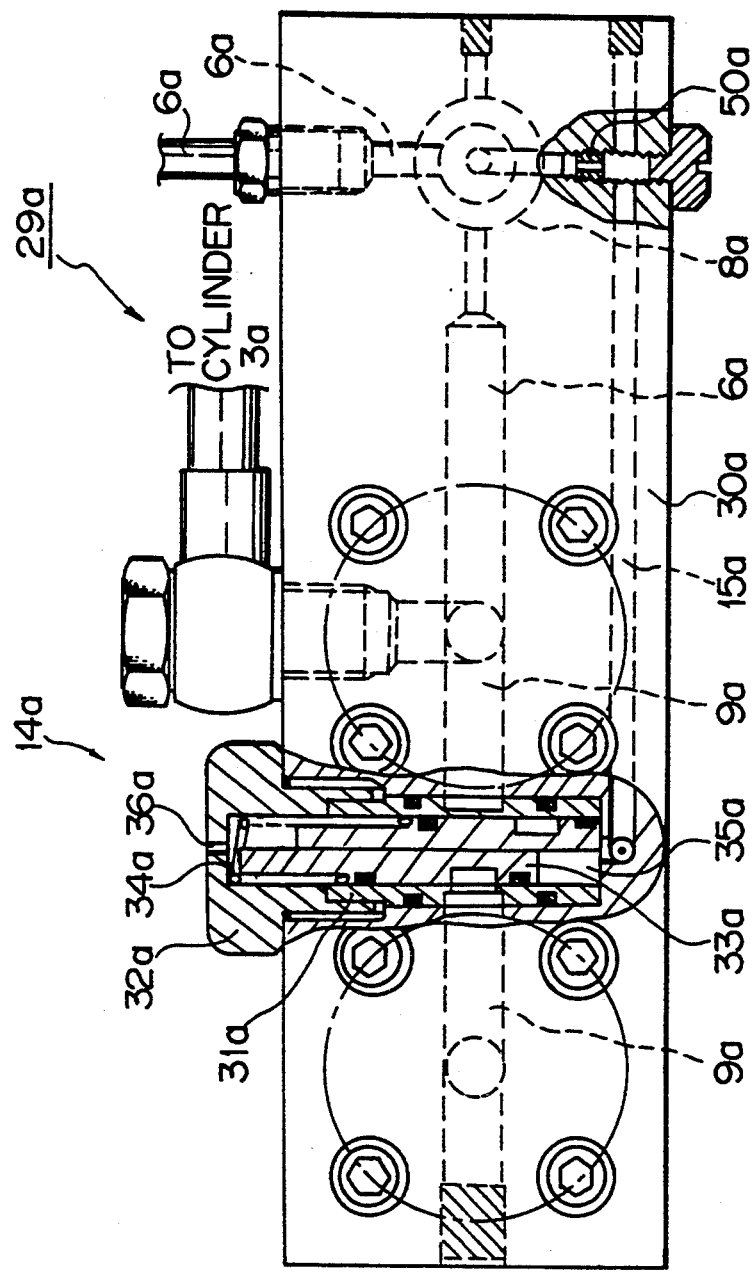
FIG. 6 is a partial sectional plan view of another example of the block member shown in FIGS. 3 and 4.

The block member 29a shown in FIGS. 3 and 4 may be replaced with a modified block member having an orifice 50a disposed in the intermediate portion of the passage that provides communication between the pilot-controlled directional control valve 14a and the branch line 6a at the position of the charge-discharge valve 8a, as shown in FIG. 6. In the vehicle height control system that employs the modified block member, the orifice 50a acts to suppress pressure oil impact (water hammer effect), so that it is possible to prevent the spool 33a from moving suddenly, and hence possible to suppress the generation of oil impulse noise.

The plug 32a shown in FIGS. 4 and 6 is formed with an orifice 36a that is communicated with the outside. The orifice 36a acts to apply resistance to the flow of air, thereby slowing down the movement of the spool 33a, and thus making it possible to eliminate the occurrence of oil impact noise.

Next, a third embodiment of the vehicle height control system according to the present invention will be described with reference to FIGS. 7 and 8. In contrast to the vehicle height control system shown in FIG. 2, this embodiment has gas springs 60a, 60b, 60c and 60d of the twin-tube type which are connected in parallel to the respective cylinders 3a, 3b, 3c and 3d in place of the combination of the first gas springs 10a, 10b, 10c and 10d, the second gas springs 11a, 11b, 11c and 11d, the first damping force valves 12a, 12b, 12c and 12d, the second damping force valves 13a, 13b, 13c and 13d, and the pilot-controlled directional control valves 14a, 14b, 14c and 14d (in this case, the gas springs 60a, 60b, 60c and 60d have the same arrangement; the following description will be made with reference to the gas spring 60a for the front left wheel as a representative). Since the other members are the same as those in the embodiment shown in FIG. 2, description of the same members is omitted.

Referring to FIG. 8, an outer tube 61a is provided with an inner tube 63a in such a manner that the inner tube 63a is suspended from one axial end face portion (hereinafter referred to as "first face portion") 62a of the outer tube 61a. A flat plate-shaped cap 64a is formed at the lower end of the inner tube 63a, and a hole 65a is provided in the center of the cap 64a. The inner peripheral surface of the hole 65a forms a valve seat 66a.

The inside of the inner tube 63a is communicated with the pump 1 through a hole (hereinafter referred to as "main hole") 67a formed in the first face portion 62a and via the charge-discharge valve 8a. In addition, a free piston 68a is slidably received in the inner tube 63a to define two chambers inside the inner tube 63a, that is, an oil chamber 69a which is closer to the main hole 67a and a first gas chamber 70a which is closer to the cap 64a. It should be noted that a second gas chamber 71a is formed between the inner tube 63a and the outer tube 61a by disposing the inner tube 63a in the manner described above.

A pilot-controlled directional control valve 73a is interposed between the other axial end face portion (hereinafter referred to as "second face portion") 72a of the outer tube 61a and the cap 64a. The directional control valve 73a comprises a covered ring-shaped guide member 75a which is provided on the second face portion 72a in such a manner as to cover a hole (hereinafter referred to as "pilot hole") 74a formed in the second face portion 72a, a valve piston 76a which is slidably received in the guide member 75a, a plunger 79a which extends in the direction of movement of the valve piston 76a and a part of which projects from a hole 78a formed in the cover 77a of the guide member 75a, and a valve body 80a which is formed on the plunger 79a such that the valve body 80a is inserted into the hole 65a in the cap 64a so as to abut on the valve seat 66a of the cap 64a. A recess is formed in the center of the bottom of the plunger 79a to form the pilot chamber 81a in cooperation with the second face portion 72a. The pilot chamber 81a is connected to the pilot line 15a (15b, 15c or 15d) through the pilot chamber 81a is supplied with pilot oil pressure by the operation of the cutoff valve 22F (22R).

The directional control valve 73a is arranged such that when pilot oil is supplied under pressure to or discharged from the pilot chamber 81a through the pilot hole 74a, the valve piston 76a, together with the plunger 79a, moves forwards or backwards, causing the valve body 80a to rest on or separate from the valve seat 66a. When the valve body 80a rests on the valve seat 66a, the communication between the first and second gas chambers 70a and 71a is cut off, whereas, when the valve body 80a separates from the valve seat 66a, the two chambers 70a and 71a are communicated with each other. Normally, the valve body 80a is placed out of contact with the valve seat 66a (i.e., the directional control valve 73a is normally open).

If the vehicle tilts due to rolling, for example, the height sensor 19a (19b or 19c) detects the occurrence of rolling and outputs a rolling detection signal to the controller 20. In response to the rolling detection signal, the controller 20 opens the cutoff valve 22F (22R) to supply pilot oil pressure to the pilot chamber 81a of the gas spring 60a.

Figure 7:
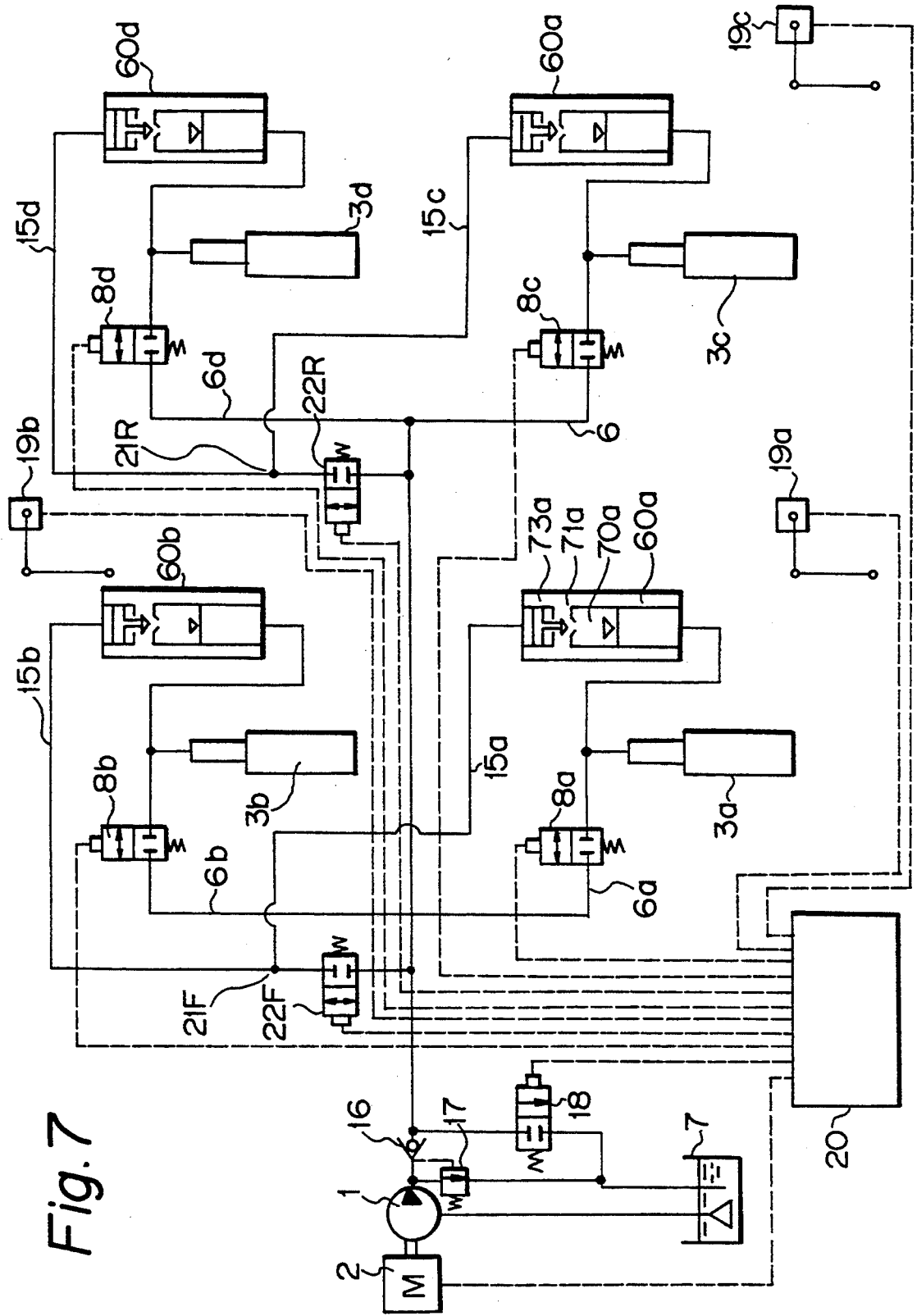
FIG. 7 is a hydraulic circuit diagram showing schematically a third embodiment of the vehicle height control system according to the present invention.

In the vehicle height control system shown in FIGS. 7 and 8, when rolling occurs, the controller 20 supplies pilot oil pressure to the pilot chamber 81a of the gas spring 60a in response to the rolling detection signal from the height sensor 19a (19b or 19c). In consequence, the valve body 80a rests on the valve seat 66a to cut off the communication between the first and second gas chambers 70a and 71a, so that only the first gas chamber 70a functions as the gas spring 60a, resulting in a rapid increase in the spring constant. Thus, the flow of hydraulic oil into the oil chamber 69a is resisted. In other words, the contraction of the cylinder 3a (3b, 3c or 3d) is suppressed to reduce the rolling.

In the vehicle height control system shown in FIG. 1 or 2, the first and second gas springs 10a and 11a are provided separately to change the spring constant, whereas in the vehicle height control system shown in FIGS. 7 and 8 two separate gas chambers (first and second chambers) 70a and 71a are formed within the outer tube 61a, and the directional control valve 73a for bringing the two chambers 70a and 71a in and out of communication is accommodated also within the outer tube 61a to thereby change the spring constant, and it is therefore possible to reduce the number of components required to change the spring constant and hence possible to further reduce the overall size of the system.

There is a possibility that a stone caused to spring up by the running vehicle will hit the gas spring 60a, although it depends on the position where the gas spring 60a is installed. However, since the free piston 68a is accommodated in the inner tube 63 which, in turn, is accommodated in the outer tube 61a, even if the outer tube 61a is deformed by impact of a stone thereon, any influence on the inner tube 63a is minimized, and there is no lowering in the function. For this reason, the gas spring 60a is superior in durability. In addition, since there is no lowering in the function even if a stone hits the gas spring 60a, as described above, the gas spring 60a can be installed below a spring of the vehicle or in a tire housing, where a stone is likely to hit. Accordingly, it is possible to obtain a correspondingly high degree of design freedom.

Thus, in the vehicle height control system according to the first aspect of the present invention, the spring constant is changed by opening and closing the pilot-controlled directional control valve, thereby making it possible to control the vehicle ride. Since the change of the spring constant and the control of the vehicle attitude stabilizing characteristics are effected by using a pilot-controlled directional control valve in place of a solenoid-operated directional control valve, which has heretofore been employed in the prior art, it is possible to obtain a large hydraulic driving force with a relatively small valve configuration. Therefore, the desired driving force can be obtained with a relatively small-sized directional control valve, and thus it is possible to reduce the overall size of the system.

According to the second aspect of the present invention, the two gas chambers provided in the gas spring are selectively communicated with and cut off from each other by the pilot-controlled directional control valve, thereby changing the spring constant. Therefore, the number of components required to change the spring constant can be reduced by an amount corresponding to a reduction in the number of components resulting from the arrangement in which two gas chambers and a directional control valve are incorporated in a single component. Thus, the overall size of the system can be further reduced.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A vehicle height control system in which oil under pressure that is generated by a pump is charged into and discharged from a cylinder provided for each wheel through a charge-discharge valve, thereby effecting vehicle height control, comprising:
    a gas spring having two gas chambers and connected to said cylinders; and
    a pilot-controlled directional control valve having a pilot chamber and provided on said gas spring so as to selectively communicate and cut off from each other said gas chambers, said directional control valve being drivable in response to charging and discharging of oil under pressure through a pilot line which is connected at one end thereof to said pilot chamber to said directional control valve and at the other end thereof to a passage connecting said charge-discharge valve and said pump.

2. A vehicle height control system according to claim 1, wherein said passage connecting said charge-discharge valve and said pump is communicated with an oil discharging valve so that the pressure in said pilot line is relieved upon actuation of the oil discharge valve.

* * * * *